INVENTOR:
CLYDE W. BAIRD,
By Chas. M. Thissen,
ATTY.

Patented June 23, 1942

2,287,406

UNITED STATES PATENT OFFICE 2,287,406

VIBRATION CONTROL APPARATUS

Clyde W. Baird, Columbus, Ohio, assignor to The Traylor Vibrator Company, a corporation of Colorado Application December 23, 1940, Serial No. 371,314

16 Claims. (Cl. 172—240)

This invention relates to control apparatus particularly adapted to control the amplitude and possibly the frequency of vibration of a vibratory type of electro-magnetic type of motor.

An object of the invention is to provide very efficient mechanism for constantly monitoring and controlling the amplitude of vibration of a vibratory motor to maintain said amplitude at a predetermined value.

Another object of the invention is to provide a system for automatically monitoring a variable characteristic of a motor and maintaining said characteristic at a substantially constant predetermined value.

A further object of the invention is to provide a time delay mechanism to protect a gaseous discharge type of valve.

A further object of the invention is to provide a system for controlling automatically the rate of current flow to an electro-magnetic motor by means of a thermionic valve in which improved means are provided for automatically adjusting the phase relation of the grid potential to the plate potential.

A further object of the invention is to provide improved mechanism for delivering undulating current to a vibratory motor in accordance with the natural period of vibration of said motor, and also providing automatic amplitude control mechanism which maintains the amplitude of vibration of said motor substantially constant at a predetermined selected value.

Another object of the invention is to provide an improved system for controlling the amplitude of vibration of the vibratory motor in which the amplitude of vibration controls the value of a generated voltage which is matched against a fixed voltage, and the differences employed to maintain automatically the amplitude of vibration at a substantially constant predetermined value.

Other objects of the invention will appear hereinafter, the novel features and combinations being set forth in the appended claims.

In the accompanying drawings.

Figure 3:
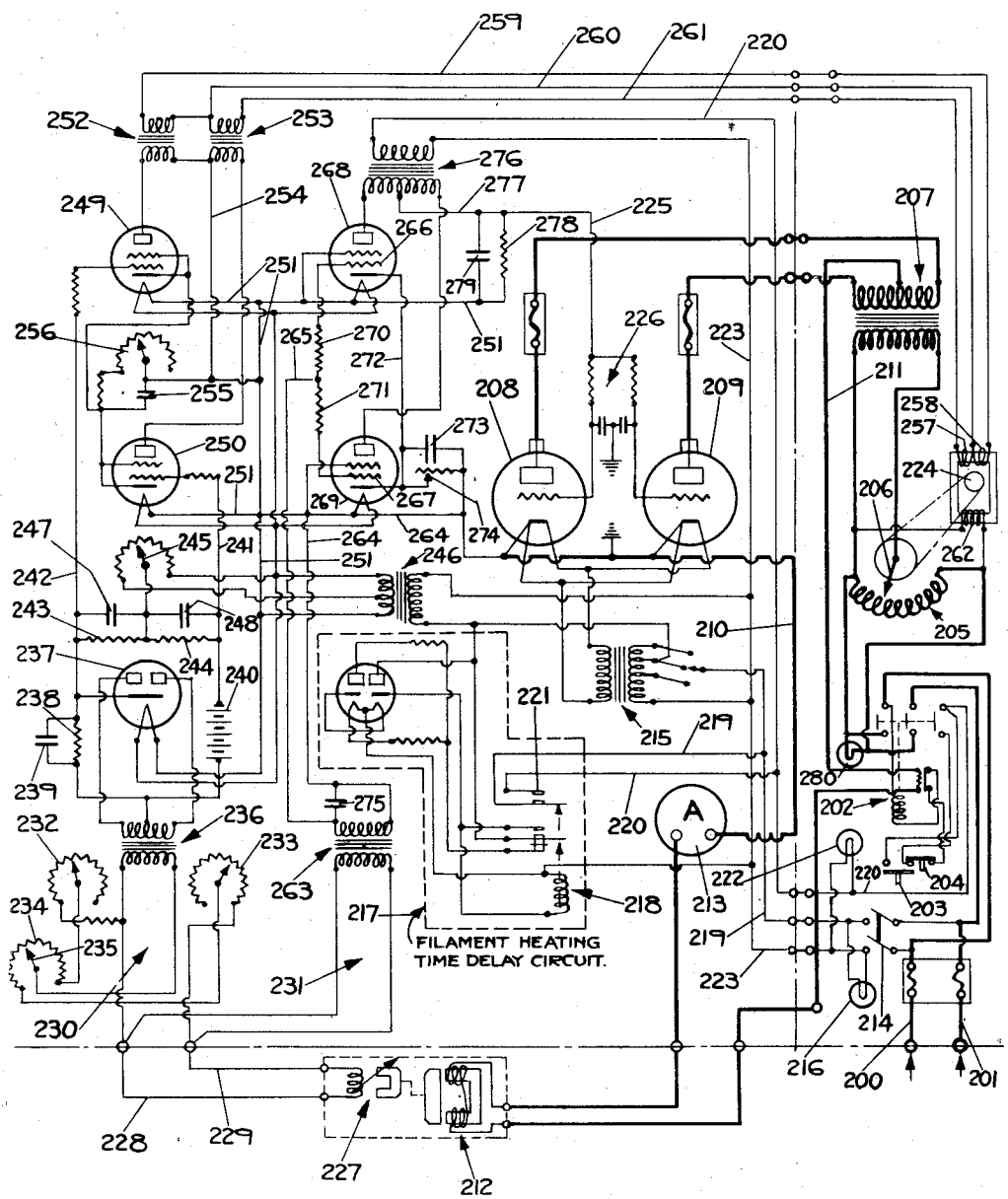
Figure 4:
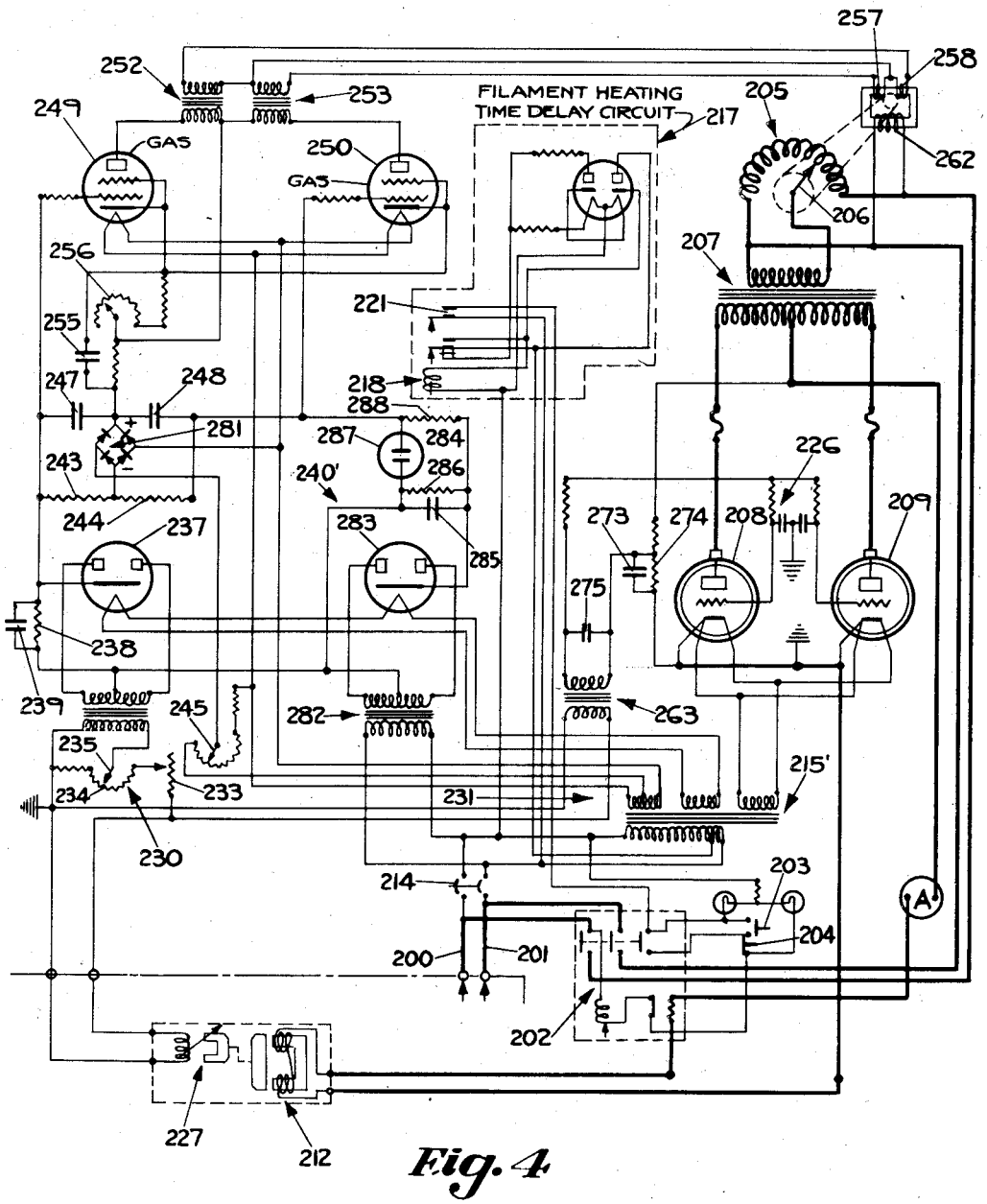

Fig. 3 is a wiring diagram of a system for delivering undulating current or impulses to a vibratory motor at a frequency which is determined by the natural period of vibration of the motor independently of the frequency of the original source of current, together with mechanism for automatically maintaining the amplitude of vibration of the vibratory motor at a substantially constant predetermined value; and Fig. 4 is a wiring diagram of a modification of a portion of the system of Fig. 3.

Figure 1:
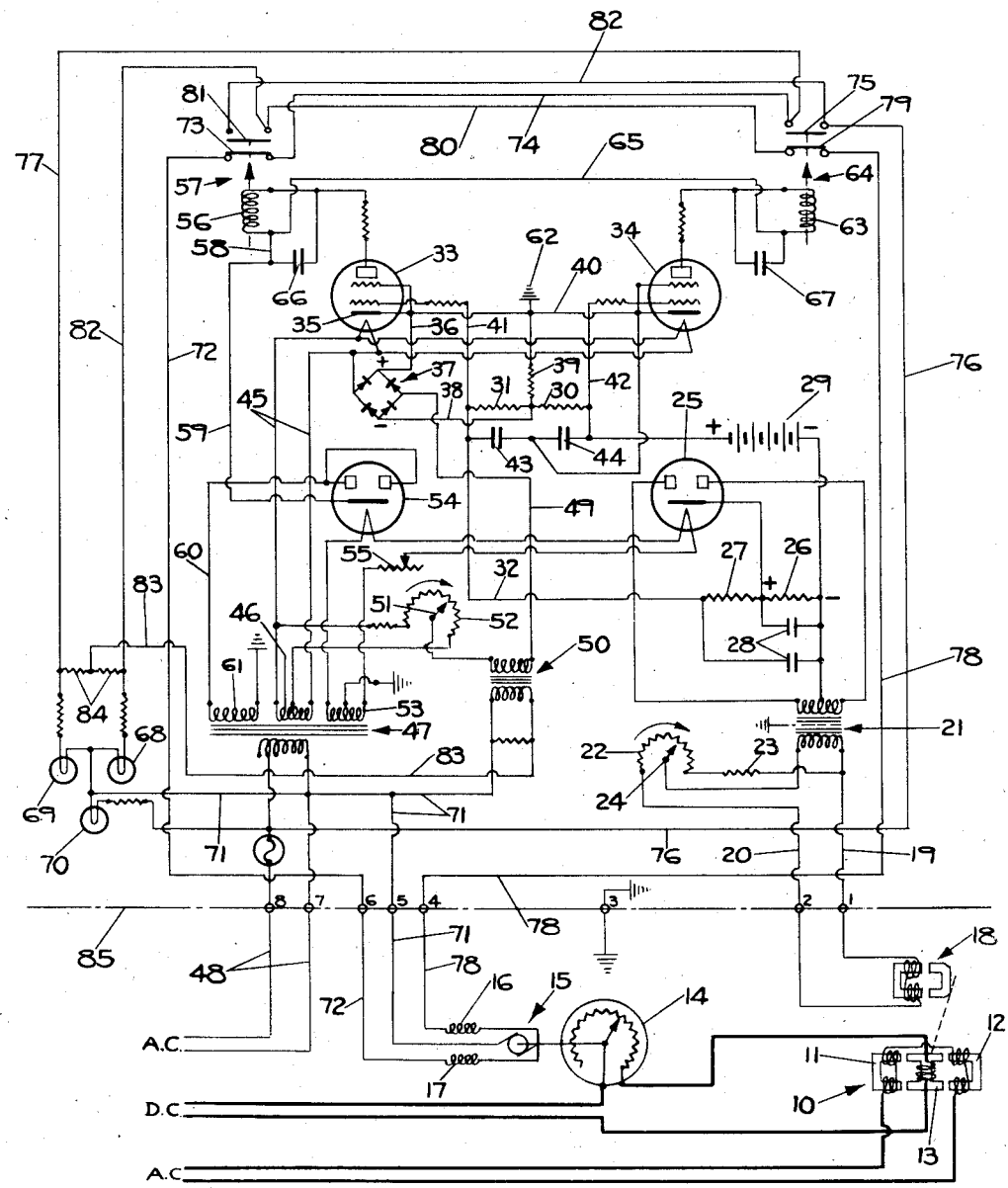
Fig. 1 is a wiring diagram of a system for automatically maintaining a predetermined amplitude of vibration of a vibratory motor incorporating the features of my invention.

Referring particularly to Fig. 1 of the drawings, there is diagrammatically illustrated at 10 a vibratory motor which is illustrated to be of the push-pull type; that is, it has two spaced-apart stationary field structures 11 and 12 which are energized from a source of alternating current and between which is a polarized vibrating armature 13 which is energized from a source of direct current voltage. As is well known, in this type of motor the amplitude of vibration can be readily controlled by controlling the degree of energization of the polarized armature 13.

It may be stated that the vibratory motor 10, while illustrated to be of the push-pull type, is not necessarily of this type at all but may be an ordinary straight alternating current motor or a mixed current motor. All three types are well known in the art. For example, the straight alternating type of motor which may be used is shown in the patent to James A. Flint, No. 2,094,787 dated October 5, 1937, and a mixed current motor is disclosed in the patent to James A. Flint, No. 1,846,326 issued February 23, 1932. Patent No. 1,779,454 to John A. Traylor dated October 28, 1930, discloses a push-pull type of motor. The current flow to the vibratory armature 13 of motor 10 is controlled by a motor driven impedance comprising a rheostat 14, the variable contact of which is controlled by reversible motor 15 having field coils 16 and 17 which are adapted to be selectively energized to cause reverse rotation of said motor 15.

The system for controlling the motor 15 operates entirely automatically to effect its adjustment whereby the amplitude of vibration of the armature 13 of vibratory motor 10 is maintained substantially constant at any predetermined value which may be selected over a wide range.

Associated with and preferably connected directly to the armature 13 is a magnetic pickup device 18 which, in the form illustrated, has a stationary field structure connected to the main frame of the motor 10 to which the field structures 11 and 12 are connected and a vibratory armature connected to the armature 13 of the motor 10, though other well-known types of pickups may be employed.

As is well known, the voltage generated in the coils of the pickup 18 is directly proportional to the amplitude of vibration of the motor 10, and consequently this generated voltage is a measurement and indication of said amplitude of vibration.

Leading from the pickup device 18 is a pair of conductors 19 and 20, the former of which leads directly to one terminal of the primary winding of a step-up transformer 21, and the latter of which leads to one terminal of a potentiometer formed by resistors 22 and 23 connected directly across conductors 19 and 20.

Associated with resistor 22 is a variable tap 24 which is connected to the other terminal of the primary transformer 21.

It is obvious that when the variable tap 24 is in its extreme lefthand position, the full voltage generated by pickup 18 is impressed upon the primary transformer 21, and when it is in its extreme righthand position the minimum voltage is delivered to the primary of said transformer. The resistor 23 is a minimum voltage resistor in that it prevents short-circuiting of the pickup coil and determines the minimum proportion of the generated voltage thereof which can be delivered to the transformer 21. In practice, I have made the resistors 22 and 23 of equal value though they may be varied in value to suit any particular installation.

The secondary of the transformer 21 is connected to a vacuum tube 25 which is connected to said secondary to form a full wave rectifier in that the two separate plates of said tube 25 are connected to opposite ends of the secondary of transformer 21, and the center tap of said secondary transformer 21 is connected to the indirectly heated cathode of said tube 25 through a resistor 26 over an obvious circuit. Therefore both of the rectified half cycles flowing through tube 25 pass through the resistor 26 which preferably has a very high resistance, for example, of the order of one megohm. To smooth out this direct current, a filter in the form of resistor 27 and filter condensers 28 is provided.

It is thus to be seen that a voltage or potential will be generated or produced across the resistor 26 which is directly proportional to the amplitude of vibration of the motor 10. This resistor 26 forms one branch of a bridgework which is employed to control automatically adjustments of the rheostat 14 to maintain the amplitude of vibration of motor 10 substantially constant. This bridge is formed by resistor 26, battery 29 which is the source of substantially constant voltage or potential, and a pair of resistors 30 and 31; that is, ignoring the filter resistor 27 which is of no particular significance insofar as the bridge is concerned, one terminal of bridge resistor 26 is connected by way of conductor 32 to one terminal of resistor 31. The other terminal of resistor 26 is connected to the negative terminal of battery 29. Resistors 30 and 31 form two branches of the bridge and are connected together. The other terminal of resistor 30 is connected to the positive terminal of battery 29 over an obvious circuit.

It may be stated at this point that during conditions of equilibrium, that is, when the amplitude of vibration of the motor 10 is operated at its preselected value, the voltage drop across resistor 26 is equal to the fixed voltage of the battery 29, and the direction of the voltage across resistor 26 is such that the negative terminal thereof is connected to the negative terminal of the battery 29. Consequently, the voltage measured across the two outer terminals of the resistors 30 and 31 is zero since the variable voltage across resistor 26 matches exactly the voltage of battery 29. If the condition of equilibrium is disturbed by virtue of any variation in the amplitude of vibration of motor 10, the value of the voltage drop across resistor 26 will either be raised or lowered. If it is raised there will be a current flow through resistors 30 and 31 in one direction, namely, from the left to the right, and if it is lowered there will be a current flow in the opposite direction due, of course, to the appearance of reverse voltage drops across the two resistors 30 and 31 under the reverse conditions mentioned. These voltage drops across resistors 30 and 31, when they appear, are employed to effect the automatic control previously mentioned in a manner now to be described.

I provide a pair of double grid gaseous tubes 33 and 34 which are normally biased to cut-off position in a manner to be described, but which are selectively rendered conducting by the appearance of reverse voltages across the resistors 30 and 31. For example, the input or grid-cathode circuit of the tube 33 is from the indirectly heated cathode 25 which has the stabilizing grid connected thereto over an obvious circuit, thence by conductor 36 to a full-wave rectifier bridge 37, then by conductor 38 to the common terminal of resistors 30 and 31 which is connected through resistor 39 to common grounded conductor 40 which is common with the cathodes of both of the tubes 33 and 34. From the common terminal of resistors 30 and 31 the input circuit of tube 33 continues through resistor 31 and thence by conductor 41 through a limiting resistor to the grid of tube 33.

It is thus to be noted that the grid-cathode or input circuit of tube 33 includes the voltage drop across resistor 31, if any is present, as well as the voltage drop across the rectifier bridge 37. This rectifier bridge 37 provides a substantially constant negative bias on the tubes 33 and 34 which biases them to cut off so that they are normally inactive. The input circuit to the tube 34 is from its cathode, thence by conductors 40 and 36 through full-wave bridge rectifier 37, conductor 38, resistor 30 and conductor 42 through a limiting resistor to the grid.

It is thus seen that full wave bridge rectifier 37 provides its biasing voltage for both the tubes 33 and 34 as previously mentioned.

As previously stated, under normal stabilized conditions when the amplitude of vibration of motor 10 is at its preselected value which may be varied of course by variations of the positions of the tap 24, there is no voltage presented across the outer terminals of resistors 30 and 31. If the amplitude of vibration of motor 10 decreases, the voltage drop across resistor 26 will be reduced which will cause a voltage to appear across resistors 30 and 31, with the righthand terminal of resistor 30 positive and the lefthand terminal of resistor 31 negative. If the amplitude of vibration increases above the normal or stabilized condition, a reverse condition will of course exist. Assuming the first mentioned condition to exist, current flows through resistors 30 and 31 in series. This voltage drop across resistor 31 will tend to make the grid of tube 33 more negative which is of course without effect since it is already biased to cut off, and it will simultaneously make the tube 34 less negative or may actually make it positive. In either event, the tube 34 will fire or, in other words, will be rendered conductive so the current flows through its cathode-plate circuit. If the reverse condition exists, tube 33 will be caused to fire or be made conductive in a like manner.

Before describing the output or plate circuits of the tubes 33 and 34, attention is directed to certain auxiliary equipment. Seen at 43 and 44 is a pair of condensers which are connected over obvious circuits directly across the grids and cathodes of tubes 33 and 34, respectively, which act as protectors against a very steep wave form in a manner well understood in the vacuum tube art. The cathodes of the tubes 33 and 34 are heated from heating filaments clearly illustrated, which are energized over a pair of conductors 45 which are supplied with voltage from a secondary winding 46 of a transformer 47, the primary of which is energized from the source of alternating current by way of conductors 48. The previously mentioned full wave bridge rectifier 37 has one of its alternating current terminals connected to one of the conductors 45 as clearly illustrated, the opposite alternating current terminal being connected by conductor 49 through the secondary winding of a normally de-energized transformer 50 and thence to a variable tap 51 associated with a potentiometer 52 connected across a portion of the secondary winding 46 of transformer 47. Adjustment of the tap 51 of potentiometer 52 provides a control for the normal value of the negative bias produced by full wave bridge rectifier 37 and applied to the input circuits of the tubes 33, 34, and this tap is of course adjusted so that each of these tubes is biased just beyond the firing or discharging grid voltage of said tubes to render them normally non-conducting.

As above stated, the transformer 50 is normally de-energized, but it is connected over a circuit hereinafter described so that whenever either of the tubes 33 or 34 fires or is rendered conducting, transformer 50 will be energized, and this will increase the voltage delivered to full wave bridge rectifier 37 and thus increase the negative bias it delivers to the tubes 33 and 34. This is found necessary in that particular circuit because of the fact that the negative bias necessary to stop the flow of current in the plate or output circuit of the tubes 33, 34 is larger than that necessary to prevent firing of said tubes 33 and 34 when they are in their normally de-energized condition.

The transformer 47 has another secondary winding 53 which supplies voltage to the heating elements of the previously mentioned vacuum tube 25 and of a double plate half-wave vacuum tube rectifier 54 in series through a variable resistor 55. As hereinafter described, the tube 54 is purely a vacuum tube switch and it is connected in the plate circuits of the gaseous tubes 33 and 34. Its function is to act as a time delay relay to prevent the application of plate voltage to the gaseous tubes 33 and 34 until the cathodes of said tubes 33 and 34 have had time to become properly heated, because as is well known, if the plate voltage is applied to the gaseous type tubes before the cathodes are properly heated, it will seriously damage them. This is not true of a vacuum tube and consequently when the system is energized the windings 46 and 53 will be simultaneously energized to start the heating of the cathodes of tubes 34, 33, 25 and 54 simultaneously. Vacuum tube 54 will however present an open circuit until it is rendered conducting by proper heating of its cathode which will require a time interval after its heater is energized. It is preferred that the heater of tubes 54 and 25 which is connected in series with it be heated at a sub-normal voltage thus increasing the normal time required to render tube 54 conducting.

Another advantage of connecting the filaments of tubes 54 and 25 in series is that if either has its filament burned out both become inoperative, thus providing an interlock between the output or gaseous plate circuits of tubes 33 and 34 and the resistor 26 in the control bridge. For example, in the absence of this interlock, if the filament of tube 25 burned out the voltage in resistor 26 would disappear causing great unbalance of the bridge with considerable operation of the rheostat 14 on the impedance unit to give a false and undesirable adjustment of the amplitude of vibration of the motor 10.

Reverting now to a consideration of the action which takes place when either of the tubes 33 or 34 fires or becomes conducting under conditions previously described, it may be noted that in case tube 33 becomes conducting the current will flow in the output, plate or cathode-anode circuit thereof through a protecting resistor, thence through coil 56 of a relay 57 and then by way of conductor 58 and conductor 59 through the switch type vacuum tube 54 which was previously described, then through conductor 60 to one terminal of a third secondary winding 61 of transformer 47. The other terminal of winding 61 is grounded, and since the cathodes of the two tubes 33 and 34 are grounded as illustrated at 62 by way of conductor 40, the output circuit of said tube 33 is complete, deriving its voltage from winding 61. The output plate or cathode-anode circuit of tube 34 includes the solenoid 63 of relay 64 and extends by way of conductor 65 to previously described conductor 58, and is completed over an obvious path in view of the above description of the path of output circuit of tube 33.

It is thus evident that whenever tube 33 is rendered conducting, relay 57 will be energized, and whenever tube 34 is rendered conducting, relay 64 will be energized. It may be pointed out that protecting condensers 66 and 67 are connected across the terminals of coils 56 and 63, respectively.

It may be stated that whenever relay 64 is energized in response to a decrease in the amplitude of vibration below the predetermined value, the field coil 17 of the reversible motor 15 is energized to decrease the impedance of resistor 14 thereby to increase the amplitude of vibration of motor 10 to restore it to said predetermined value, and likewise whenever relay 57 is energized in response to an increase in amplitude of vibration above the predetermined value, field coil 16 of reversible motor 15 is energized to increase the impedance or resistance of rheostat 14 thereby to reduce the amplitude of vibration of motor 10 and restore it to the predetermined value.

Relays 57 and 64 are interlocked to preclude their simultaneous operation, and associated with each is a signal lamp, the signal lamp associated with relay 57 being seen at 68 and the signal lamp associated with relay 64 being seen at 69. These signal lamps are preferably in the form of gaseous discharge tubes and have a very high resistance connected in series with them.

Another signal lamp 70 is formed in a cluster with signal lamps 68 and 69 and is connected directly across the terminals 48 so that whenever terminals 48 are energized as by turning on the line switch, signal lamp 70 will indicate this condition. The circuit by which field coil 17 and the armature of motor 15 is energized will now be traced.

The righthand conductor 48 which leads from the source of alternating current supply for the control system is connected to conductor 71 which leads to one commutator brush of the motor 15, the other brush of which is common with the field coils 16 and 17.

From the field coil 17 a conductor 72 extends through normally closed contact 73 of relay 57 which, under the conditions being described, is de-energized. Conductor 74 extends from normally closed contact 73 to a terminal of normally open contact 75 of relay 64. However, since relay 64 is now energized under the conditions being considered, contact 75 is closed and the path extends through it to conductor 76 which is directly connected to the other conductor 48 of the source of alternating current supply.

It is to be noted that this circuit includes the normally closed contact 73 of relay 57, and this provides an interlock between relays 57 and 64 so that they both cannot be simultaneously energized because each, when energized, breaks the circuit to the other.

Under the conditions just described, with tube 34 energized and relay 64 energized, field coil 17 is energized with the armature of motor 15 and the current flow to the motor 10 is adjusted thereby to increase its amplitude of vibration, and when this amplitude reaches a predetermined set value the voltage drop across resistor 26, which was previously below the value necessary to balance that across battery 29, will have built up until this balance is reached whereupon tube 34 will be rendered non-conducting in a manner previously described, and relay 64 will drop out whereupon motor 15 will stop and a stabilized condition of the vibratory motor 10 at its predetermined amplitude of vibration restored. Whenever relay 64 is energized as above described, signal light 69 is also energized to indicate this condition, the circuit to it being from energized conductor 71, lamp 69, conductor 77, the now closed contact 75 of relay 64, and the other energized conductor 76.

When tube 33 is fired or conducting and relay 57 energized, the field coil 16 of the reversible motor 15 is energized to cause a decrease in the current flow to the motor 10 to decrease its amplitude of vibration and restore it to a predetermined selected amplitude. This circuit is by way of energized conductor 71, commutator of motor 15, field coil 16, conductor 78 through normally closed contact 79 of relay 64, conductor 80, normally open contact 81 of relay 57 which is now closed, conductor 82 to conductor 76 which is energized from the other side of the line 48 as previously described. This relay 57 will be de-energized whenever the motor 10 is returned to its condition of equilibrium in a manner obvious from the above description of the operation of relay 64. When relay 57 is energized, the signal light 68 is also energized since the voltage on conductor 80 is extended thereto by way of conductor 82. As was previously pointed out, whenever either of the relays 57 or 64 is energized, the normally de-energized transformer 50 is energized to increase the negative biasing effect of the full wave bridge rectifier 37 on the grid or input circuits of the two gaseous tubes 33 and 34 to compensate for the required increase of negative bias to stop the flow of current through either of said tubes once they are rendered conducting. This circuit for the primary of transformer 50 is by way of conductor 71, which is always energized whenever voltage is on the lines 48, which is connected to one terminal of said primary. The other terminal of the primary is connected by conductor 83 to the center tap of a resistance bridge 84 connected across conductors 77 and 82.

As previously described, when relay 64 is energized, conductor 77 is energized from line 76, and when relay 57 is energized, conductor 82 is energized from line 76. Thus, when either of these relays 57 or 64 is energized, conductor 83 will be energized from line 76 and transformer 50 will be energized to supply the increased voltage to full wave bridge rectifier 37 as above described.

It may be noted that the conductors 19, 20, 48, 71, 72 and 78 are all shown connected to terminal posts, and preferably the control apparatus shown above the dotted line 85 is contained in a metal box and terminals or posts are provided on a plate therein to provide for connections external to said box. The box is also preferably grounded and it will be seen that numerous parts of the apparatus are grounded for the purpose of preventing undesirable transient voltages in various parts of the control system.

From the above description it is of course evident that the amplitude of vibration of the motor is automatically maintained constant at any predetermined or desired value, and this predetermined amplitude may be variably determined over a wide range of selective values by adjusting the variable tap 24.

The control system operates to supervise or monitor the amplitude of vibration at all times by virtue of the pickup device 18 which provides a voltage on a resistor 26 which at all times is proportional to the amplitude of vibration. This voltage on resistor 26 is continuously compared with or measured against the constant voltage of battery 29, and any variation in voltage on resistor 26 with respect to the voltage of battery 29 will cause operation of either the tubes 33 or 34 which are normally biased to an inoperative condition; that is, if the voltage generated or produced across resistor 26 increases above the fixed voltage of battery 29, tube 33 will be rendered conducting and will be kept conducting until the motor driven rheostat 14, 15 operates to reduce the amplitude of vibration of the motor 10 to restore it to its predetermined value whereupon the stability of the system is again realized with tube 33 rendered non-conducting. A reverse condition will cause energization of the tube 34 with a reverse operation of motor driven rheostat 14, 15, to produce stability of operation. This system has been found in practice to be very sensitive and to give very accurate control of the amplitude of vibration of the vibratory motor 10. It is of course obvious that other types of impedance control may be provided to control the amplitude of vibration of the motor 10, and other types of motors may be employed. Likewise, other types of pickups from that specifically illustrated at 18 may be employed, and numerous modifications may be made in the details of the system without departing from the spirit of my invention.

Figure 2:
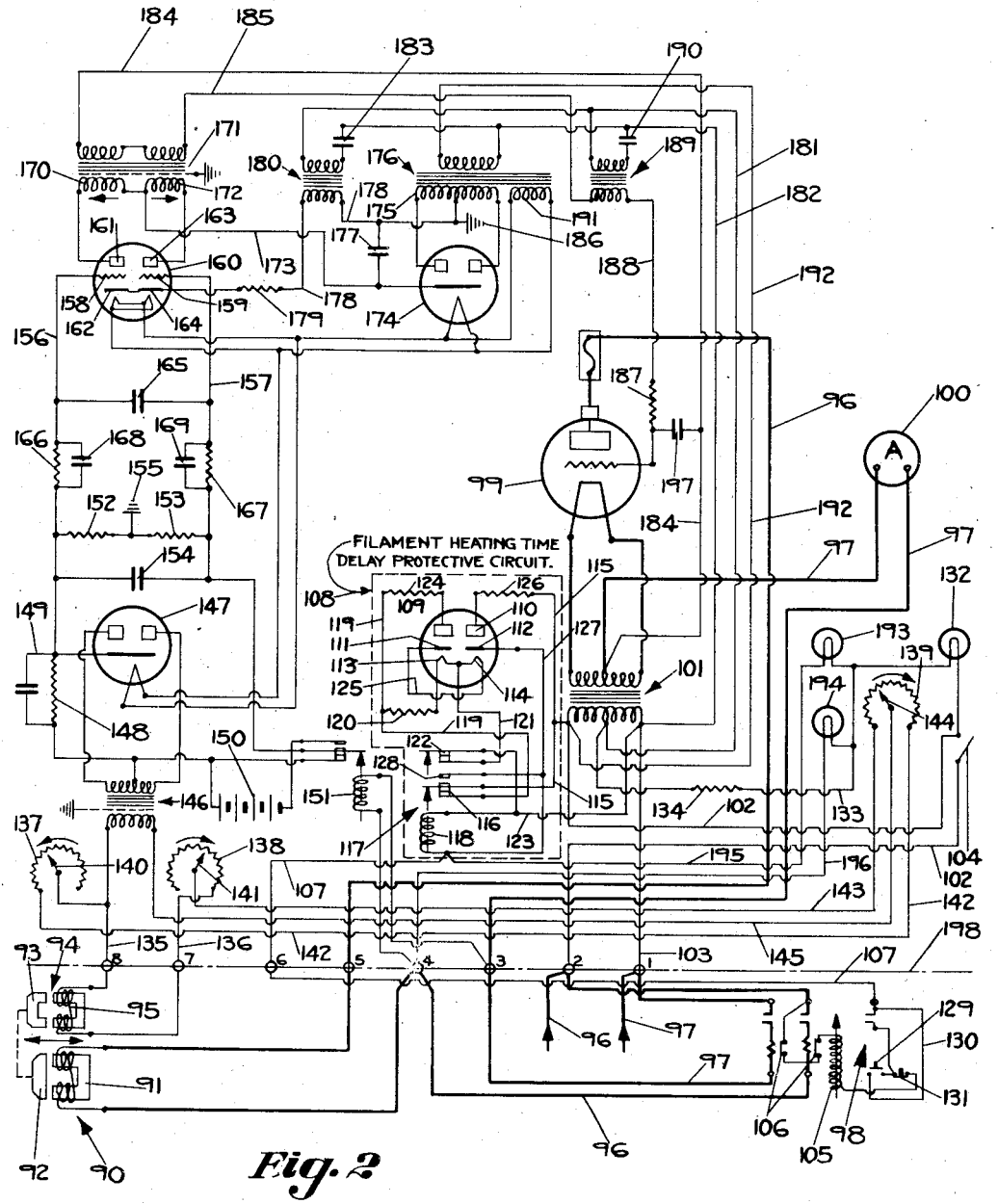
Fig. 2 is a wiring diagram of a system for reducing by a half the effective impulses delivered from a source of alternating current and for maintaining automatically the amplitude of vibration of a vibratory motor.

In Fig. 2 of the drawings there is illustrated a system for delivering undulating current or current impulses to a vibratory motor, which impulses are derived from an alternating current source and in which the frequency of vibration of the vibratory motor is just half what it would be if it were energized directly from a source of alternating current and in which a gaseous discharge tube is employed to deliver said current impulses, which gaseous discharge tube is controlled in a manner to control the current flow to said motor to maintain its amplitude of vibration substantially constant at a predetermined value which may be varied over a wide range. The vibratory motor 90 may be of the type disclosed in the above identified patent to James A. Flint No. 2,094,787 though of course other vibratory motors may be employed, said motor having a stationary field 91 and a vibratory armature 92 connected to a vibratory armature 93 of a magnetic pick up device 94 having a stationary field structure 95. Power for operating the vibratory motor 90 is derived from a source of alternating current by way of power mains or conductors 96 and 97 which extend through two normally open contacts of a three-contact magnetic switch 98. The conductor 96 extends to and through the field coil of the motor 90 and thence to the plate or cathode of gaseous discharge electronic tube 99. A conductor or main 97 extends through an ammeter 100 to the center tap of the secondary winding of the transformer 101, the outer terminals of which are connected to the cathode or filament of the tube 99.

Heating current for the cathode of tube 99 is provided from the transformer 101, the primary of which is connected to the mains 96 and 97 through conductors 102 and 103, the former of which has a switch 104 interposed therein. It is of course evident that only heating current for the filament or cathode of tube 99 will flow in the primary of transformer 101 while the power current delivered to the motor 90 will be spread between the two halves of the secondary winding since all of this current flows through the tube 99. The tube 99 acts as a half-wave rectifier so that the positive halves of the alternating current voltage delivered to the output, plate or cathode-anode circuit are utilized whereby the frequency of vibration of the motor 90 is just half what it would be if alternating current were supplied to it.

The rate of current flow to the motor 90 as measured by an ammeter, such as ammeter 100, and thus the amplitude of vibration of the motor 90 may be very effectively controlled by controlling the phase relation of the input, grid or cathode-control electrode voltage with respect to the plate, output or cathode-anode voltage.

The system which I have provided automatically adjusts this phase relation between the grid voltage and the plate voltage, which expressions will be used in the interest of shortness, to maintain said amplitude of vibration of vibratory motor 90 substantially constant in a manner now to be described.

As previously described in connection with the gaseous tubes 33 and 34 of Fig. 1, to prevent injury to the tube 99, its plate voltage should not be applied until its cathode has been brought up to proper temperature, and to provide this protective feature I provide a filament heating time delay protective circuit which is contained in the dotted lines so labeled in the drawings which precludes closing the contacts of the magnetic switch 98 until after a predetermined time interval during which the cathode of tube 99 has been heated to the desired temperature. Upon the closing of switch 104 heating of said cathode begins. At this time, however, voltage is not available for the operating coil 105 of magnetic switch 98 for although one terminal thereof is connected directly to conductor 96 through overload protective cutout relays 106, the other terminal of the coil 105 can only be energized when conductor 107 is energized, and this can only take place after the filament heating time delay protective circuit 108 has connected conductor 107 to conductor 102 in a manner now to be described.

When switch 104 is closed, as aforedescribed, the voltage is applied to the primary of transformer 101 as also above described, and this voltage is transferred to the device 108 over a circuit to be described. Before describing said circuit, it may be pointed out that the device 108 includes a double cathode-anode vacuum tube of the indirectly heated cathode type comprising anodes 109 and 110, cathodes 111 and 112, and heater elements 113 and 114. When transformer 101 was energized as above described a circuit is provided to the heater element 113 extending from the terminal of conductor 102 and primary of transformer 101 to conductor 115, normally closed contacts 116 of a relay 117 having an operating coil 118, thence by conductor 119 through resistor 120, thence through heating element 113 and common conductor 121 through upper normally closed contacts 122 of relay 117, then by way of conductor 123 to energize conductor 103 and the other terminal of the primary transformer 101. This starts the heating of the cathode 111 from the heating element 113, the heating time being prolonged by virtue of the resistor 120. When cathode 111 is brought up to sufficient temperature to become conducting, the current will flow from plate or anode 109 to cathode 111 since said plate 109 is connected to energized conductor 119 through resistor 124. This path is from plate 109, resistor 124, conductor 119 which is connected to the energized line 102 as above described, cathode 111 being connected to the other energized line 103 through a conductor 125, heater element 114 and common conductor 121 which, as afore-described, is connected to said energized conductor 103. This current flow then starts the heating of cathode 112 from heater element 114 and after a predetermined time which is extended by virtue of resistor 124, cathode 112 is heated to a conducting temperature. When this temperature is reached the current flows from the plate 110 which is connected to energized conductor 102 through resistor 126 and conductor 115 while the circuit leads from cathode 112 through conductor 127, thence through the coil 118 of relay 117 and to energized conductor 123 which is permanently connected to conductor 103 energizing said coil 118. Coil 118 upon being energized opens the normally closed contacts 116 and 122 breaking the circuit to the heater coils 113 and 114 and removing the plate voltage from the plate 109. At the same time a holding circuit is provided for the coil 118 through normally open contacts 128 which are now closed which interconnect conductors 115 and 127 leading from energized conductor 102 to the lower terminal of coil 118, the other terminal of said coil 118 being directly connected to energized conductor 103 over conductor 123 as previously described.

The closing of contacts 128 also extends the energized conductor 102 by way of conductors 115 and 127 to the conductor 107 thus making voltage available for the operating coil 105 after this time-interval has passed following the energization of the transformer 101 which of course starts heating of the cathode of gaseous tube 99.

With conductor 107 energized, the magnetic switch 98 may be operated by the operator closing the normally open push button switch 129 which extends voltage on conductor 107 to the lower terminal of coil 105 by way of conductor 130 and normally closed stop push button switch 131. When coil 105 is energized the contacts of switch 98 apply plate voltage to the gaseous tube 99 over the two lefthand contacts and by way of conductors 97 and 96 as previously described. At the same time a holding circuit is provided for the coil 105 through the third pair of contacts of magnetic relay 98 which includes the normally closed stop switch 131. When the contacts of magnetic switch 98 are closed the tube 99 will operate to rectify the alternating current thereby causing only successive half cycles or current impulses to flow through the windings of vibratory motor 90 whereupon the frequency of vibration of said motor 90 will be equal to that of the line frequency. A signal lamp 132 is energized when switch 104 is closed to indicate this condition, said lamp 132 deriving the voltage from energized line 102 and from a center tap of the primary of transformer 101 by way of conductor 133 having a limiting resistor 134 in series therewith.

It is a fact which is explained in some detail in my copending application Serial No. 297,622 for "Vibrating apparatus control" filed October 2, 1939, that the amount of current flowing to the motor 90 as measured by the ammeter 100 may be controlled from substantially zero to a maximum amount determined by the rating of the tube 99 by controlling the phase relation of the input, grid or cathode-controlling electrode voltage or potential with respect to the plate, anode or output voltage of said tube 99, and I may state that my improved system is such that under normal conditions there is substantially a 90° lag between the grid voltage and the plate voltage of said tube 99 which is shifted in opposite directions to decrease or increase the normal current flow. In other words, the normal output of the tube 99 is neither the maximum nor the minimum but is at a value between the two, and the amplitude control is operative automatically to shift this normal value. It must be understood that this normal value is entirely independent of the stable condition of operation or the condition of operation which exists when the amplitude of vibration of the vibratory motor is operating at a predetermined value which may be at any selected value between adjustable limits as hereinafter described.

Attention is now directed particularly to the mechanism for shifting this phase relation of grid and plate voltages to effect automatically the maintaining of the amplitude of vibration of the vibratory motor at any predetermined selected value which may be varied between adjustable limits. The voltage generated by the pickup 94 is proportional to its amplitude of vibration which is the same as or proportional to the amplitude of vibration of motor 90. This voltage is applied to a pair of conductors 135 and 136 across which is connected a potentiometer formed by two variable resistors 137 and 138 and a fixed resistor 139, the first two mentioned resistors having variable contacts 140 and 141, respectively. The path of this connection between conductors 135 and 136 is from conductor 135, variable contact 140, resistor 137, conductor 142, resistor 139, conductor 143, variable contact 141 and resistor 138 to conductor 136. The function of the variable resistor 138 is to adjust the maximum amplitude of vibration of the machine and the function of the variable resistor 137 is to adjust the minimum amplitude of vibration thereof. Between this maximum and minimum adjustment the amplitude of vibration of the vibratory motor is determined by the position of the variable tap or contact 144 associated with the resistor 139 which is connected by way of conductor 145 to one terminal of the primary winding of transformer 146, the other terminal of which is connected directly to the conductor 135. Once the maximum and minimum amplitudes are set by the adjustable contacts 140 and 141, respectively, any amplitude of vibration between these two values may be automatically obtained by adjusting the position of variable tap 144.

The secondary of transformer 146 is connected to a full wave vacuum tube rectifier 147 having an obvious circuit which includes the resistor 148 provided with a filtering condenser 149, across which resistor 148 a direct current voltage is provided which is of course proportional to the voltage generated by the pickup 94 for each setting of the variable tap 144. This resistor 148 forms one leg of a bridge in a manner quite analogous to the resistor 26 of Fig. 1, another leg of which includes battery 150 providing a source of constant voltage or potential.

When the system is de-energized the battery 150 is disconnected for otherwise, due to the almost instantaneous control of the phase shifting mechanism there would be a tendency for the battery 150 to assume control when the vibratory motor first started, and for a short time interval feed the maximum of current thereto.

With the battery 150 disconnected, the tube 99 limits the starting current to the motor and thereafter battery 150 is automatically thrown in circuit in the bridge by virtue of a switch-over relay 151 which connects the battery in the bridge over an obvious circuit when said relay is energized, said relay being energized immediately upon closure of the magnetic switch 98 over obvious conductors 96 and 97, respectively. Connected across the positive terminals of the battery 150 and the resistor 148 is a pair of resistors 152 and 153 which complete the bridge. A filtering condenser 154 is preferably connected across said resistors 152 and 153. For each setting of the variable tap 144 there will be a certain amplitude of vibration of motor 90 at which the voltage drop across resistor 148 will just match the voltage of battery 150, and consequently there will be no current flow through resistors 152 and 153.

Unlike the operation of the bridge in the system of Fig. 1, this condition of matched voltages of battery 150 and resistor 148 does not necessarily represent an equilibrium condition, and in fact under most circumstances it will not represent such a condition. In other words, during normal operation of the system in order to maintain the amplitude of vibration of the motor 90 at a predetermined value as determined by the position of the variable tap 144, it will be necessary for the bridge including battery 150, resistor 148 and resistors 152 and 153 to be unbalanced because of the fact that it will be necessary either to increase or decrease the normal current flow through the gaseous tube 99 which has a predetermined value determined by the normal phase relation of the grid and plate voltages thereof which is fixed as hereinafter described in the absence of the phase shifting effect produced by the above described bridge. In practice this predetermined current flow is generally about half the rated current flow of the tube 99, and of course this uncontrolled current flow is entirely independent of the position of tap 144.

In case the amplitude of vibration of the vibratory motor falls off from its predetermined setting, the voltage drop across resistor 148 will likewise fall off and there will be a change in current flow through resistors 153 and 152 in the nature of an increase in current flow from the right to the left though it may actually be a decrease in current flow in the reverse direction. An increase in the amplitude of vibration of motor 90 above the predetermined value will produce a reverse effect.

The common terminals of the resistors 152 and 153 are connected to ground at 155 and their other terminals are connected by conductors 156 and 157, respectively, to grids 158 and 159, respectively, of a double indirectly heated three-electrode vacuum tube 160. The vacuum tube 160 has a plate or anode 161 and a cathode 162 associated with the grid 158 and a plate or anode 163 and a cathode 164 associated with the grid 159.

To produce a time delay in the control effect of the vacuum tube 160, I provide time delay mechanism in the form of a condenser 165 of relatively high capacity, connected between the conductors 156 and 157, and I also provide relatively high resistors 166 and 167 in the conductors 156 and 157, respectively, said resistors 166 and 167 being provided with relatively small capacity by-pass condensers 168 and 169, respectively.

The plate 161 extends to one terminal of a winding 170 of a double primary transformer 171, and the plate 163 is connected to one terminal of an oppositely wound winding 172 forming the other primary winding of the transformer 171. The primary windings 170 and 172 being oppositely wound, they will have a differential effect, and if the current in the two is equal the output voltage in the secondary of the transformer 171 will be zero. The common terminals of the two windings 170 and 172 are connected by conductor 173 to one terminal of a source of direct current which constitutes the plate voltage for both output or plate circuits of the tube 160. This source of direct current is in the form of a full wave rectifier consisting of a full wave rectifier tube 174 energized from the split secondary 175 of transformer 176, said full wave rectifier including a filtering condenser 177 connected between the oppositely poled conductors 173 and 178 of said source of direct current. The two cathodes 162 and 164 of the tube 160 are connected together and are connected to conductor 178 through a self-biasing resistor 179 and a secondary of a transformer 180 which supplies a modulating alternating current to said cathodes and the grids 158 and 159. The input or primary winding of the transformer 180 derives voltage from a pair of conductors 181 and 182, the former of which is connected to a center tap on the primary winding of transformer 181, and the latter of which is connected to one terminal of said last mentioned primary winding. Said primary winding of transformer 180 has a phase shifting condenser 183 which is for the purpose of controlling the phase of the modulating current in the two input circuits of the tube 160, that any voltage generated in the secondary of transformer 171 and delivered to conductors 184 and 185 which are connected to the outer terminals of said secondary, will be in phase with the line voltage, or in other words the voltage on conductors 181 and 182.

The input or grid-cathode circuits of the tube 160 extend from the two cathodes 162 and 164 through conductor 178 and negative biasing resistor 179, secondary of transformer 180, conductor 178 to ground at 186 and thence from the ground at 155 between resistors 152 and 153, the grid circuits to the two grids 158 and 159 split, that to the former being by way of resistor 152, resistor 166 and conductor 156, while that to the latter is by way of resistor 153, resistor 167 and conductor 157.

As previously stated, the windings 170 and 172 forming the double primary of transformer 171 are reversely effective. Consequently, if there is no voltage drop across resistors 152 and 153, which is only a special condition but which may be considered as a basis for understanding the operation of the system, there will be no voltage generated in the secondary of transformer 171 even though there is a direct current flow between the cathodes and anodes or, in other words, in the plate circuits of both halves of the vacuum tube 160, because their effect on the transformer 171 is neutralized.

Likewise, the modulated alternated current provided by the transformer 180 will not result in the development of any voltage in the secondary of transformer 171 because of the neutralizing effect of windings 170 and 172. However, when there is a voltage differential between that in resistor 148 and the battery 150 which will be a normal condition, the conductor 156 will either be positive or negative with respect to the conductor 157 and by virtue of the resistors 152 and 153 a differential bias will appear on the grids 158 and 159; that is, one will be made more negative with respect to its cathode than its normal negative bias while the other will be made less negative with respect to its cathode than its normal negative bias, and this of course will produce a differential flow of fluctuating current in the windings 170 and 172 which will produce a voltage in the secondary winding of transformer 171 which will be applied to conductors 184 and 185, and the value of this voltage delivered to conductors 184 and 185 will be directly proportional to the differential voltage delivered to conductors 156 and 157, and its direction will be determined by the direction of this potential differential on conductors 156 and 157; that is, if conductor 156 is positive with respect to conductor 157 the voltage on conductors 184 and 185 will be directly proportional to the value of this positive differential, and this voltage will be either positive or negative as the case may be with respect to the line voltage.

Conversely, if conductor 157 is positive with respect to conductor 156 the reverse condition will exist, and the phase relation of the voltage delivered to conductors 184 and 185 will be just the reverse from what it was from the condition previously assumed.

As pointed out in my application above identified, a phase shift of a voltage with respect to any reference can be effected by adding to the voltage to be shifted an out-of-phase voltage so that the resulting voltage is the vector sum of the two voltages, and this possible mode of control is employed by me to determine and vary the amount of current flowing through the tube 99 from instant to instant. For example, the input or grid circuit of the tube 99 extends from its grid through a protective resistor 187, conductor 188, and one terminal of the secondary winding of a transformer 189, the other terminal of which is connected to previously mentioned conductor 185. The previously mentioned conductor 184 is connected to the cathode of the tube 99 by virtue of being connected to the center tap of the secondary of the transformer 101. A grid protecting condenser 197 is connected between conductors 188 and 184.

It is thus seen that the input or grid voltage applied to the tube 99 will be the vector sum of the voltage generated in the secondary of transformer 189, and the voltage generated in the secondary of transformer 171, if any, and under normal conditions there will be such a voltage except, of course, when the vibratory motor 90 is first placed into operation.

The primary of the transformer 189 is energized from the previously described conductors 181 and 182 through a phase shifting condenser 190 which has such a value that considering the voltage generated in the secondary of transformer 189 alone, this voltage will lag the line voltage or, in other words, the voltage applied to the plate of the tube 99, by approximately 90°. If there is no voltage generated in the secondary of transformer 171 the voltage generated in the secondary of transformer 189 alone will represent the grid or input voltage of tube 99, and consequently due to this 90° phase relation between the grid or input voltage and the plate or output voltage of tube 99, the tube 99 will be conducting only over approximatedly half of the positive cycle of the plate voltage, under which conditions the current flow through the tube 99 will be only approximately half its rated value. This provides the starting current feature previously mentioned and also provides a very convenient feature to swing the grid voltage either positively or negatively. In other words, if the voltage supplied by secondary of transformer 171 is lagging with respect to the voltage supplied by the secondary of transformer 189, the current flow through the tube 99 will be decreased, and if it is leading the said voltage on the secondary of transformer 189 the current flowing through tube 99 will be increased, and the amount of this increase or decrease will be determined by the value of this voltage generated in the secondary of transformer 171. The voltage generated in the secondary of transformer 189 is of course substantially constant, and as previously pointed out, its phase relation with respect to the plate voltage to the tube 90 is substantially fixed and is preferably 90° lagging.

Also, as previously pointed out, the voltage generated in the secondary of transformer 171 is in phase with the plate voltage of the tube 99, or it is 180° out of phase depending upon which of the coils 170 or 172 has the predominant effect. The possible maximum voltage developed in the secondary of transformer 171 is preferably considerably larger than that developed in the secondary of transformer 189 so that quite a wide swing of the resulting grid voltage of the tube 99 may be effected. It is of course understood that as the grid voltage on tube 99 swings toward an in-phase relation with the plate voltage, the current flow through the tube 99 increases, and as it swings toward an increased out-of-phase relation the current flow through tube 99 decreases. The maximum flow of current through tube 99 of course is when the grid voltage and plate voltage are in phase, and the minimum is when they are 180° out of phase.

In addition to the circuits previously described, it may be pointed out that cathode heater filaments for the tubes 147, 160 and 174 are provided which are heated from secondary winding 191 of transformer 176, and said transformer 176 is energized by virtue of the fact that the primary winding has one terminal connected to conductor 182 and another terminal connected to a conductor 192, which in turn is connected to one terminal of the primary winding of transformer 101. In other words, the primary of transformer 176 is connected directly across the main line when switch 104 is closed.

In addition to the signal lamp 132 which indicates that switch 104 is closed, there are two other signal lamps 193 and 194, the former of which is illuminated when relay 117 is energized since one terminal of it is connected to conductor 133 and the other terminal connected to conductor 107 by way of conductor 195, the latter when energized indicates that switch 98 is closed since one terminal is connected to conductor 133 and the other to conductor 96 after it has passed through the contacts of switch 98, this connection being by way of conductor 196.

It may be pointed out that the operator, after closing switch 104, should wait until lamp 193 is illuminated before pressing the button 129 to close switch 98 because, as previously mentioned, until relay 117 operates which is indicated by energization of lamp 193, the closing of the start push button 129 will be without effect.

The operation of the system of Fig. 2 is believed evident from the above description and, briefly described, is as follows:

Switch 104 is first closed which starts the heating of the filament or cathode of the gaseous discharge tube 99 and signal lamp 132 is illuminated indicating this fact.

Also the filament heating time delay protective circuit 108 starts to operate to extend voltage so that switch 98 may be operated after a predetermined time, during which the cathode of tube 99 comes up to the desired operating temperature. After this time interval voltage is extended to conductor 107 and lamp 193 is illuminated to indicate this fact. The operator then presses button 129 which closes the magnetic switch 98 which is maintained closed until stopped by the operator pushing button 131. Upon the closing of switch 98 current from the power mains 96 and 97 flows through the motor 90 under the control of the tube 99 which is connected in series therewith. Tube 99 acts as a half-wave rectifier thus rectifying the alternating current delivered thereto, and the first few impulses of current flowing through tube 99 will be controlled by the phase relation of its grid voltage to its plate voltage which will be approximately 90°.

The vibration of the motor 90 will generate a voltage in the pickup 94, a portion of which is delivered to the full-wave rectifier tube 147 as determined by the position of variable tap 144 associated with resistor 139. Rectifier 147 produces a voltage drop across resistor 148 which is matched against the fixed voltage of battery 150 which is thrown in the bridge circuit by relay 151 which energizes simultaneously with relay 117.

Under normal conditions the voltage drop across resistor 148 will not match the voltage of battery 150, and assuming that the voltage drop across said resistor 148 is less than battery 150, it is evident that conductor 157 will be positive with respect to conductor 156, and consequently grid 159 will be positive with respect to grid 158 in tube 160.

Stated another way, grid 159 will be positive with respect to its cathode 164, and grid 158 will be negative with respect to its cathode 162. This will cause a differential current flow in windings 172 and 170 which will produce a voltage in the secondary of transformer 171 which is 90° out of phase with the component of grid voltage of the tube 99 provided by the secondary winding of transformer 189. Whether this voltage generated in the secondary of transformer 189 will increase or decrease the current flow through tube 99 is not at all dependent upon whether the voltage drop across resistor 148 is more or less of battery 150 but is determined by the position of the variable tap 144.

Assuming that the variable tap 144 has a predetermined position and that contacts 140 and 141 are fixed and not changed, the amplitude of vibration of motor 99 will either increase or decrease until a predetermined amplitude of vibration thereof is produced which is determined by the position of variable tap 144 and by adjusting the variable tap 144 this predetermined position may be varied between the maximum amount which is determined by the position of variable contact 140 and the minimum amount which is determined by the position of contact 141.

It is of course evident that the amplitude of vibration of the motor 99 is automatically maintained, because in case the amplitude thereof increases beyond that predetermined by the position of variable contact 144, there will be a voltage generated by pickup 94 which is utilized by resistor 148 to produce a voltage in the secondary of transformer 101 which increases the lag of the grid voltage of tube 99 with respect to its plate voltage, thus reducing the current flow through it.

Conversely, if the amplitude of vibration of motor 99 is reduced below that demanded by the position of variable tap 144, the reduced voltage in pickup 94 produces a reduced voltage drop across resistor 148 which produces a voltage in the secondary of transformer 171 which brings grid voltage more in phase with the plate voltage of tube 99, thus increasing the current flow to motor 99 to restore its amplitude of vibration to the predetermined amount.

It may be also pointed out that in the system of Fig. 2 the dotted line 198 represents the dividing line between the apparatus contained in a metal container and the external apparatus, that above said line 198 being within the container. Consequently, the conductors which extend from said container preferably lead to terminals which are indicated and which are carried on a terminal block within the metal container. This, of course, includes conductors 96, 97, 107, 135 and 136.

Referring now to Fig. 3 of the drawings, there is seen a system for supplying impulses to a vibratory motor which impulses are independent of the frequency of the source of current and are preferably controlled by the natural period of vibration of the vibratory motor itself, together with mechanism for automatically maintaining the amplitude of vibration of the motor at any predetermined value which may be varied over a wide range.

In view of the fact that many of the features of the system of Fig. 3 are similar to features found in Fig. 1 or Fig. 2, the description of this system will not be quite as detailed as that of Figs. 1 and 2.

A pair of power mains 200 and 201 are fed from any desired source of alternating current and are controlled by a magnetic switch 202 provided with a start push button 203 and stop push button 204. When switch 202 is closed as hereinafter described after a predetermined time interval, following the energization of a circuit for heating the filaments of the gaseous discharge tubes in response to operation of push button 203, an auto transformer 205 is energized and feeds a variable voltage by way of a motor driven variable tap 206 to the primary of transformer 207, the external secondary terminals of which are connected to the plates of gas filled tubes 208 and 209 which act as a full-wave rectifier to rectify the alternating current delivered thereto, which rectified current is delivered over conductors 210 and 211 to a vibratory motor 212 which may be of any desired construction, for example, it may be of the type disclosed in the above mentioned patent to James A. Flint No. 2,094,787, there being an ammeter provided in the conductor 210 as illustrated at 213.

To start the operation of the system a switch 214 is closed which energizes a transformer 215, the secondary of which supplies current to the filaments or cathodes of the tubes 208 and 209 over an obvious circuit. The signal lamp 216 indicates the condition of the switch 214.

The closing of switch 214 also starts into operation a filament heating time delay circuit 217 which in general is similar to the previously described filament heating time delay protective circuit 108 disclosed in Fig. 2 so that after a predetermined time interval relay 218 is energized and in addition to closing a holding circuit on itself, connects conductors 219 and 220 by way of normally opening contacts 221 which makes available voltage for the magnetic switch 202 since conductor 219 is connected to main 201 through switch 214 and conductor 220 extends to said switch 202.

A signal lamp 222 connected across conductor 220 and a conductor 223 is energized when relay 218 is energized since conductor 223 is connected to the main 200 when switch 214 is closed. This signal lamp when illuminated indicates to the operator that he can close the magnetic switch 202 by pushing the button 203 and thus supply plate voltage to energize the tubes 208 and 209.

It may be stated generally that the amplitude of vibration of the vibratory motor 212 is controlled by adjusting the adjustable tap 206 automatically since it is driven from a reversible motor 224.

Furthermore, the current which flows through tubes 208 and 209 which would be direct current in the absence of some modifying means is effectively converted into pulsating current at a controllable frequency by means of variations in the bias in the grids on said tubes 208 and 209 which are connected together and to a conductor 225, said grids having a filter 226 connected thereto for filtering and protecting said grids.

To provide for the automatic control of the frequency and amplitude of vibration of the motor 212, the former preferably in accordance with the natural period of vibration of said motor, I provide a pickup 227 which is adapted to generate a voltage proportional to the amplitude of vibration of the motor 212 in a manner previously described or in any other known or desired manner.

The voltage generated in pickup 227 is delivered to conductors 228 and 229 and branch into two branches or channels generally designated as the amplitude control branch or channel 230 and the frequency control branch or channel 231. The amplitude control branch 230 includes adjustable maximum amplitude control resistor 232, adjustable minimum amplitude control resistor 233, and the amplitude control resistor 234 having a variable tap 235. The operation of the resistors 232, 233 and 234 is best evident from the above description of similar devices 137, 138, 139, 140, 141 and 144 in connection with Fig. 2.

The adjustable voltage as determined by the position of variable tap 235 is fed to transformer 236 having in its output circuit a full-wave rectifier vacuum tube 237 which rectifies the current delivered thereto which flows through balancing bridge resistor 238 provided with by-pass filter condenser 239. Resistor 238 is in one branch of a bridge, the other branch of which includes a constant voltage battery 240, the positive terminal of which is connected to conductor 241, the positive terminal of resistor 238 being connected to conductor 242.

The bridgework which includes battery 240 and resistor 238 is completed by resistors 243 and 244 connected across conductors 241 and 242 and the center tap of these two resistors 243 and 244 is connected to the variable tap 245 of a potentiometer which derives an alternating current voltage from a transformer 246 connected across conductors 223 and 219.

Filtering condensers 247 and 248 are connected across resistors 243 and 244, respectively.

It is evident from the description so far given relative to the amplitude control branch of the control system that it is quite similar to the amplitude control system of Fig. 1 of the drawings, and in common with Fig. 1 of the drawings it may be stated that unlike the system of Fig. 2 of the drawings, when the amplitude of vibration of vibratory motor 212 is at its predetermined value as determined by the variable position of the variable tap 235 the voltage drop across resistor 238 will match the voltage of battery 240, and thus under conditions of stable vibration there will be no voltage between conductors 241 and 242 and no current flow in resistors 243 and 244. It is evident that conductor 242 is connected to the control grid of a gaseous tube 249 and conductor 241 is connected to the control grid of a gaseous tube 250, each through protective resistors.

Each of the gaseous electron discharge tubes 249 and 250 has a predetermined variable alternating current negative bias on its grid with respect to the alternating voltage on its plate so that each of said tubes 249 and 250 is normally biased non-conducting; and said tubes will be selectively and alternately rendered conducting when conductor 241 becomes negative with respect to conductor 242, and vice versa, these reverse conditions of course being in response to reverse variations of the amplitude of vibration of the motor 212 from a preselected amplitude and causing reverse current flows through resistors 243 and 244 which are in the grid circuits of the tubes 249 and 250, respectively.

The normal negative bias previously mentioned is provided by the transformer 246 since one terminal of its secondary is connected to a conductor 251 which is connected to each of the cathodes of each of the tubes 249 and 250 through the network 255, 256 described below. Each of said cathodes has a stabilizing grid connected in parallel therewith. A variable portion of the upper half of the secondary winding of transformer 246 is connected to both of the grids of the tubes 249 and 250 by way of the variable tap 245 which is connected to the common terminal of resistors 243 and 244 which are individual to the grids of tubes 249 and 250, respectively as above described and as is obvious from the drawings.

The plate circuit of the tube 249 has in circuit therewith a secondary winding of a transformer 252 and the plate circuit of the tube 250 has in circuit therewith a secondary winding of a transformer 253. A common conductor 254 for each of said plate circuits is provided and leads to a very high capacity condenser 255 which is shunted by a variable resistor combination 256.

The function of this network 255, 256 is to prevent hunting of the motor driven auto transformer 205 and it operates in that when there is a large difference of voltage between conductors 241 and 242 due of course to a wide variation of the amplitude of vibration of motor 212 from its preselected value, there will be a substantially continuous rotation of the motor 224, but as the amplitude of vibration of the motor 212 approaches its preselected value, either from above or below said preselected value, this network 255, 256 will cause intermittent rotation of the motor 224 which in effect reduces the rate of change of amplitude of vibration of the motor 212 from that which was produced when there was a wide variation in said amplitude from its preselected value. In other words, this network 255, 256 prevents hunting of the motor 224 which controls the variable tap 206 of the auto transformer 205.

The secondaries of transformers 252 and 253 are connected across a pair of shading coils 257, 258 of the motor 224 which adjusts the variable tap 206 of the auto transformer 205, the connection between said transformer secondaries and shading coils being by way of conductors 259, 260 and 261. The motor 224 is of well known construction, and when shading coil 257 is short-circuited it will rotate in one direction and when shading coil 258 is short-circuited it will rotate in the other direction, and when neither is short-circuited, it will not move. These coils 257 and 258 are normally energized because the motor 224 has a field coil 262 which is constantly energized whenever magnetic switch 202 is closed since it is connected directly across the terminals of auto transformer 205.

By virtue of the magnetic coupling between the coil 262 and the shading coils 257 and 258, voltage is normally induced in each of said shading coils and this voltage is delivered to the secondary windings of transformers 252 and 253 by way of conductors 259, 260 and 261; and this voltage is the plate voltage for the two tubes 249 and 250 after it is stepped up by transformers 252 and 253. As a result, whenever tube 249 becomes conducting as above described, it effectively short-circuits transformer 252 which effectively short-circuits shading coil 258 thereby causing a corrective adjustment of auto transformer 205. Similarly, when tube 250 becomes conducting transformer 253 is effectively short-circuited and shading coil 257 is consequently short-circuited causing a reverse corrective operation of the auto transformer 205.

It is thus evident that the current delivered to the vibratory motor 212 will be maintained substantially constant at any predetermined value which is selected by the position of variable tap 235, and of course this predetermined value may be adjusted by adjusting the position of said tap.

Attention is now directed to the apparatus forming the frequency control branch 231 of the control system.

Branching from the previously described conductors 228 and 229 is a pair of conductors leading to transformer 263, the secondary of which extends to a pair of conductors 264 and 265. Conductor 265 leads to the control grids 266 and 267 of a pair of double grid gaseous tubes 268 and 269, respectively, through grid resistors 270 and 271, respectively, while the conductor 264 leads to the cathodes of said gaseous tubes 268 and 269 which are connected in parallel by a conductor 272, there being an oscillating circuit formed by a condenser 273 and a variable impedance 274 connected between conductors 272 and 264. A grid protecting condenser 275 is connected across the secondary of transformer 263 and between conductors 264 and 265. The oscillating circuit provided by condenser 273 and impedance 274 is to insure the presence of impulses to the gaseous tubes 208 and 209 as hereinafter described during starting of the vibratory motor and impedance 274 is adjusted so that the oscillation period of this circuit, which is of course connected in the input circuit of the tubes 268 and 269, will approximately equal the natural period of vibration of the motor 212. It is by no means necessary to have exact matching of these two, because the frequency of the motor 212 immediately takes control once vibration is started.

It may be mentioned that each of the tubes 249, 250, 268 and 269 has a stabilizing grid which is connected to the filament and cathode over an obvious circuit. The tubes 268 and 269 are connected to form a full-wave rectifier, the plate potential being provided for each by way of a transformer 276 connected across conductors 220 and 223. The output circuit of said tubes 268 and 269 is obvious and extends from conductor 277 leading to the center tap of the primary of transformer 276 as viewed from the tubes 268 and 269, conductor 251 being connected to the cathodes of said tubes 268 and 269 and forming the other conductor in the out-put circuits of tubes 268 and 269, across which a resistor 278 is connected through which the plate current from the tubes 268 and 269 flows, there being a sustaining and filtering condenser 279 connected across resistor 278. The voltage drop across resistor 278 is applied to the grids of gaseous tubes 208 and 209 by way of previously mentioned conductor 225 connected to said grids of tubes 208 and 209. The lower terminal of the resistor 278 is connected to the cathodes of said tubes 208 and 209 over an obvious circuit including conductors 251 and 264.

The filaments of all the tubes 237, 249, 250, 268 and 269 are energized in parallel by the secondary winding of transformer 246 over obvious circuits.

In the operation of the system of Fig. 3 the switch 214 is first closed which starts heating of the filaments of the gaseous discharge tubes 208 and 209 and signal light 216 is energized. Filament heating time delay circuit 217 is started into operation by the closing of said switch 214 and after a predetermined time interval its relay 218 is energized and voltage is available to operate the main line magnetic switch 202 which is indicated to the operator by the energization of signal lamp 222. The operator then pushes start push-button 203 to close the magnetic switch 202 which starts the system in operation and it remains in operation until stop push button 204 is pushed.

It may be pointed out that a signal lamp 280 is connected across the terminals of auto transformer 205 to indicate the condition thereof. The vibratory motor starts to operate by the initial impulses of current flowing to it through gaseous tubes 208 and 209 and very shortly reaches an amplitude of vibration which is automatically determined by the position of the variable tap 235 which of course may be adjusted to vary the amplitude of vibration of the motor 212.

During a normal condition of operation when the amplitude of vibration is at its predetermined value, the bridge including battery 240, resistor 238 and resistors 243 and 244 will be balanced. In other words, there will be no voltage drop between conductors 241 and 242 and in this respect the system of Fig. 3 is similar to the system of Fig. 1 and not similar to the system of Fig. 2. Any variation in the amplitude of vibration in the motor 212 will automatically produce an unbalance in the bridge because of an increase or decrease in the voltage drop across resistor 238 depending upon whether the amplitude increases or decreases from its predetermined value. Any such variation in amplitude is effective as above described to adjust the position of the variable tap 206 on auto-transformer 205 thereby adjusting automatically the plate voltage of and consequently the current flow through the tubes 208 and 209 and to the motor 212 connected in series therewith.

As previously described, any wide variation of amplitude of vibration of the motor 212 from its predetermined value will produce a quick corrective response, but as the amplitude of vibration of said motor approaches its stable value the corrective effect is reduced thus preventing hunting. The frequency of the impulses of current which flow through the tubes 208 and 209 is preferably determined by the natural period of vibration of the motor 212, and this is true of the system disclosed in Fig. 3 because pickup device 227 is controlled directly by said motor 212. If a separate source of voltage were provided for the frequency control channel 231, for example as from a pick-up device associated with a tuning fork, the frequency of the impulses delivered to the motor 212 might be independently controlled. I prefer, however, to have the frequency of said impulses controlled by the natural period of vibration of the motor 212.

The two tubes 268 and 269 are essentially amplifier tubes connected as a full wave rectifier with respect to transformer 276. Consequently they amplify the voltage on the grids to produce a pulsating voltage across resistor 278 which is delivered to the grids of tubes 208 and 209. I have found that in some instances amplification of the pickup voltage is not necessary in which case the pickup voltage may be delivered without amplification to the grids of tubes 208 and 209. Said tubes 208 and 209 are preferably of the negative conducting type; that is, they will conduct current unless there is a negative voltage on their grids. The same is true with respect to tubes 268 and 269 which are preferably also gas filled tubes though vacuum tubes may be employed.

It is of course evident that when alternating current voltage is applied to the grids of said tubes 268 and 269 by the pick-up they will conduct current when their plates are alternately positive except when the grid impulse is negative, and when they conduct current the current will flow through resistor 278 having condenser 279 connected across it thus making the grids of tubes 208 and 209 negative so that they do not conduct. In other words, tubes 268 and 269 when conducting shut off tubes 208 and 209, and when tubes 268 and 269 are non-conducting, tubes 208 and 209 will automatically become conducting.

It is of course evident that the frequency at which the grids of tubes 208 and 209 are made negative will determine the frequency of the impulses delivered to the motor 212, and since in the preferred embodiment of my invention this is determined by the natural period of vibration of the motor 212 itself, it will govern the frequency of the undulating current delivered to said motor 212.

Fig. 4 shows a system which is primarily a modification and simplification of the system of Fig. 3, and so instead of describing it in detail, I shall describe only the features in which it differs from those of Fig. 3, it being understood unless a contrary fact is indicated, that the description of Fig. 3 will apply to Fig. 4.

In the system of Fig. 4 I provide a transformer 215' which is substituted for the transformer 215 of Fig. 3. Transformer 215' has three secondary windings, the righthand one of which energizes the filaments and cathodes of the electronic discharge tubes 208 and 209. The lefthand secondary winding of transformer 215' takes the place of the secondary winding of transformer 246 of Fig. 3, and in addition to supplying the filaments of electronic discharge tubes 249 and 250 it supplies voltage for a fullwave rectifier bridge 281 providing a direct current negative bias on the grids of the tubes 249 and 250 which replaces the alternating current negative bias of the system of Fig. 3. Sensitivity control of the grid bias is provided by control apparatus 245.

In the system of Fig. 4 I have substituted for the battery 240 a source of constant direct current voltage which I shall now describe which is indicated generally by the reference character 240'. Said source of constant direct current voltage is provided by transformer 282 which derives power from the mains 200 and 201 over an obvious circuit when switch 214 is closed.

Connected to the secondary of the transformer 282 is a full wave rectifier including a vacuum tube 283, the output circuit of which extends from the cathode to the center tap of the secondary of transformer 282 and includes a bridge 284 comprising a condenser 285 having a resistor 286 connected across the terminals thereof, and across which terminals there is connected a neon tube 287 and a resistor 288, that is, neon tube 287 and resistor 288 are effectively connected in series and together are in parallel with resistor 286 and condenser 285.

In such a network the voltage drop across the terminals of the neon tube 287 will be substantially constant regardless of any variations in line voltage, and this constant voltage drop is connected in the bridgework including resistors 238, 243 and 244 where the battery 240 was previously connected in the system of Fig. 3 over an obvious circuit. In other words, the voltage drop across neon tube 287 in the system of Fig. 4 is substituted for the voltage of battery 240 of the system of Fig. 3.

It may also be pointed out that the filaments of the tubes 237 and 283 are heated from the middle secondary winding of the transformer 215, and consequently if either of said tubes 237 and 283 burns out the other will simultaneously be disconnected.

It is also evident that in the system of Fig. 4 the tubes 268 and 269 have been eliminated and the frequency control channel or branch 231 is operative solely through the transformer 263 to apply the pickup voltage to the grids of the electronic discharge gaseous tubes 208 and 209 without tube amplification. The in-put circuit to the tubes 208 and 209 is obvious and includes filter 226 and the oscillating circuit provided by the condenser 273 and impedance 274 to insure starting of the impulses to the motor 212.

The operation of the system of Fig. 4 is fundamentally the same as Fig. 3 and therefore need not be described. It is simplified, however, in a number of respects in that the number of tubes employed is reduced and the system is simplified by the elimination of the battery 240 of Fig. 3 which of course would have to be renewed from time to time. There are other simplifications in the signaling and control system which are obvious and need not be specifically described.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. Vibratory control apparatus comprising a vibratory electro-magnetic motor, means for maintaining the amplitude of vibration thereof at a substantially predetermined fixed value comprising means for controlling the current flow to said motor, mechanism for producing a voltage proportional to the amplitude of vibration of said vibratory motor, means for matching the produced voltage with a standard voltage, and mechanism responsive to both positive and negative differences between said produced voltage and said standard voltage to adjust said motor current controlling means.

2. Vibratory control apparatus comprising a vibratory electro-magnetic motor, means for maintaining the amplitude of vibration thereof at a substantially predetermined fixed value comprising means for controlling the current flow to said motor, mechanism for producing a voltage proportional to the amplitude of vibration of said vibratory motor, means for matching the produced voltage with a standard voltage, and mechanism responsive to differences between said produced voltage and said standard voltage to adjust said motor current controlling means.

3. Electro-magnetic vibrator means comprising means for controlling the current flow thereto, mechanism for producing a voltage determined by the amplitude of vibration of the vibrator, a source of substantially constant voltage, a pair of coils having separate paths, means including electronic tube means energizing one of said coils when said produced voltage is greater than the constant voltage and energizing the other of said coils when said produced voltage is smaller than the constant voltage, and mechanism operable by said coils to operate said vibrator current controlling means to decrease or increase the current flow to said vibrator, respectively, when said one coil or said other coil is energized.

4. Electro-magnetic vibrator means comprising means for controlling the current flow thereto, mechanism for producing a voltage determined by the amplitude of vibration of the vibrator, a source of substantially constant voltage, a pair of coils having separate paths, means energizing one of said coils when said produced voltage is greater than the constant voltage and energizing the other of said coils when said produced voltage is smaller than the constant voltage, and mechanism operable by said coils to operate said vibrator current controlling means to decrease or increase the current flow to said vibrator, respectively, when said one coil or said other coil is energized.

5. Vibratory apparatus comprising an electromagnetic vibrator, means for maintaining the amplitude of vibration thereof at a substantially predetermined value comprising means for controlling the current flow to said vibrator, automatic amplitude responsive control means for said current controller means comprising a rectangular bridge having a fixed voltage source in one leg and a voltage source in another leg which varies with variations in the amplitude of vibration of said vibrator, a pair of impedances forming the other two legs of said bridge, electronic tube means including grid-cathode circuits, one connected across each of said impedances and having biasing means in circuit therewith, said electronic tube means including a pair of individual output circuits, and means controlled by the selective energization of said output circuits so constructed and arranged that they produce reverse effects on said current controller means.

6. Vibratory apparatus comprising an electromagnetic vibrator, means for maintaining the amplitude of vibration thereof at a substantially predetermined value comprising means for controlling the current flow to said vibrator, automatic amplitude responsive control means for said current controller means comprising a rectangular bridge having a fixed voltage source in one leg and a voltage source in another leg which varies with variations in the amplitude of vibration of said vibrator, a pair of impedances forming the other two legs of said bridge, electronic tube means including grid-cathode circuits, one connected across each of said impedances, said electronic tube means including a pair of individual output circuits, and means controlled by the selective energization of said output circuits so constructed and arranged that they produce reverse effects on said current controller means.

7. In vibratory apparatus, the combination with a vibratory motor, rotary motor operated mechanism for adjusting the amplitude of vibration of said vibratory motor, and mechanism for determining the amplitude of vibration of said vibratory motor and for operating said rotary motor in reverse directions when said amplitude varies on opposite sides of a predetermined amplitude of vibration thereby to maintain the amplitude of vibration of said vibratory motor substantially constant.

8. Apparatus of the class described comprising an electric motor, means for controlling a variable characteristic of said motor, means operable in response to variations of said variable characteristic from a predetermined value comprising a rectangular bridge having in one leg a source of variable D. C. voltage which varies in accordance with variations of said characteristic from said predetermined value, a source of fixed D. C. voltage in the other leg, a pair of impedances forming the other two legs of said bridge, electronic tube means comprising separate input and output circuits each having its input circuit connected across one of said impedances, a direct current biasing source in each input circuit biasing it to prevent a normal flow of current in its associated output circuit, and mechanism operable in response to differential energization of said output circuits to adjust the variable characteristic of said motor to return it to said predetermined value.

9. Apparatus of the class described comprising an electric motor, means for controlling a variable characteristic of said motor, means operable in response to variations of said variable characteristic from a predetermined value comprising a rectangular bridge having in one leg a source of variable voltage which varies in accordance with variations of said characteristic from said predetermined value, a source of fixed voltage in the other leg, a pair of impedances forming the other two legs of said bridge, electronic tube means comprising separate input and output circuits each having its input circuit connected across one of said impedances, a direct current biasing source in each input circuit biasing it to prevent a normal flow of current in its associated output circuit, and mechanism operable in response to differential energization of said output circuits to adjust the variable characteristic of said motor to return it to said predetermined value.

10. Apparatus of the class described comprising an electric motor, means for controlling a variable characteristic of said motor, means operable in response to variations of said variable characteristic from a predetermined value comprising a rectangular bridge having in one leg a source of variable D. C. voltage which varies in accordance with variations of said characteristic from said predetermined value, a source of fixed D. C. voltage in the other leg, a pair of impedances forming the other two legs of said bridge, electronic tube means comprising separate input and output circuits each having its input circuit connected across one of said impedances, and mechanism operable in response to differential energization of said output circuits to adjust the variable characteristic of said motor to return it to said predetermined value.

11. Apparatus of the class described comprising an electric motor, means for controlling a variable characteristic of said motor, means operable in response to variations of said variable characteristic from a predetermined value comprising a rectangular bridge having in one leg a source of variable voltage which varies in accordance with variations of said characteristic from said predetermined value, a source of fixed voltage in the other leg, a pair of impedances forming the other two legs of said bridge, electronic tube means comprising separate input and output circuits each having its input circuit connected across one of said impedances, and mechanism operable in response to differential energization of said output circuits to adjust the variable characteristic of said motor to return it to said predetermined value.

12. In apparatus of the class described, the combination with a vibratory electro-magnetic motor, of mechanism for controlling the current flow to said motor to maintain its amplitude of vibration substantially constant comprising an electronic tube having a cathode, an anode and a control electrode through which tube the motor current flows, means for applying an alternating current cathode-anode potential to said tube, means for applying an alternating current cathode-control electrode potential to said tube which is normally out of phase with and lagging said cathode-anode potential, and means operating in response to variations in the amplitude of vibration of said electro-magnetic motor above or below its desired predetermined value to adjust the phase relation of said cathode-control electrode potential relative to said cathode-anode potential to reduce or increase said phase relation, respectively, thereby automatically adjusting the current flow to said motor, said last named means comprising a bridge including a source of fixed potential and means providing a source of variable potential controlled by the amplitude or vibration of said motor.

13. In apparatus of the class described, the combination with a vibratory electro-magnetic motor, of mechanism for controlling the current flow to said motor to maintain its amplitude of vibration substantially constant comprising an electronic tube having a cathode, an anode and a control electrode through which tube the motor current flows, means for applying an alternating current cathode-anode potential to said tube, means for applying an alternating current cathode-control electrode potential to said tube which is normally out of phase with and lagging said cathode-anode potential, and means operating in response to variations in the amplitude of vibration of said electro-magnetic motor above or below its desired predetermined value to adjust the phase relation of said cathode-control electrode potential relative to said cathode-anode potential to reduce or increase said phase relation, respectively, thereby automatically adjusting the current flow to said motor, said last named means comprising mechanism to vary the rate of adjustment of said phase relation in accordance with the amount of said amplitude variation from said predetermined value.

14. In apparatus of the class described, the combination with a vibratory electro-magnetic motor, of mechanism for controlling the current flow to said motor to maintain its amplitude of vibration substantially constant comprising an electronic tube through which tube the motor current flows, and means operating in response to variations in the amplitude of vibration of said electro-magnetic motor above or below its desired predetermined value to adjust automatically the current flow to said motor, said last named means comprising mechanism to vary the rate of current adjustment in accordance with the amount of said amplitude variations from said predetermined value including a condenser-impedance network.

15. A vibratory motor system comprising a vibratory electro-magnetic motor, means for maintaining the amplitude of vibration thereof at a substantially constant value comprising a source of voltage which has a value determined by the amplitude of vibration of said motor and variable with variations of said amplitude from a predetermined value, means producing a pair of related alternating current voltages, a source of fixed voltage, and means for reversely shifting the normal phase relation of said alternating current voltages in response to opposite variations in the value of said variable voltage relative to said fixed voltage.

16. A vibratory motor system comprising a vibratory electric motor, means for maintaining the amplitude of vibration thereof substantially constant comprising an electron discharge tube having a control element, means providing alternating current anode and control element voltages to said tube to control the current flow therethrough, and means responsive to the amplitude of vibration of said motor capable of swinging the relative phase relation of said two voltages in an amount exceeding ninety degrees thereby providing a wide range of automatic amplitude control.

CLYDE W. BAIRD.